United States Patent [19]
Worden

[11] 3,988,014
[45] Oct. 26, 1976

[54] WORK STATION ASSEMBLY

[75] Inventor: Charles P. Worden, Woodland Hills, Calif.

[73] Assignee: Wangco Incorporated, Los Angeles, Calif.

[22] Filed: Mar. 10, 1975

[21] Appl. No.: 556,805

[52] U.S. Cl. ................................. 269/71; 269/74
[51] Int. Cl.² ........................................ B23Q 1/04
[58] Field of Search ................ 269/55, 58, 59, 71, 269/74; 214/1 D

[56] References Cited
UNITED STATES PATENTS

| | | | |
|---|---|---|---|
| 2,432,058 | 12/1947 | Wiken et al. | 269/59 |
| 3,168,893 | 2/1965 | Johnson | 269/71 |
| 3,248,101 | 4/1966 | Müller et al. | 269/58 |
| 3,458,056 | 7/1969 | Stefan et al. | 264/55 |
| 3,829,063 | 8/1974 | Molzworth | 214/1 D X |

FOREIGN PATENTS OR APPLICATIONS

| | | | |
|---|---|---|---|
| 755,894 | 8/1956 | United Kingdom | 269/55 |
| 879,911 | 10/1961 | United Kingdom | 269/55 |

*Primary Examiner*—Al Lawrence Smith
*Assistant Examiner*—Robert C. Watson
*Attorney, Agent, or Firm*—Henry M. Bissell

[57] ABSTRACT

A work station assembly for efficiently removing a production item from a conveyor and for adjustably retaining it in a variety of translational and rotational attitudes for facilitating production tasks thereupon. A base supports a framework that may be translated into abutment with the conveyor for loading of the production item onto the work station assembly. Rotational bearings are provided so that the framework and the retained production item may be rotated about both vertical and horizontal axes. The framework may be locked in a variety of angular and translational positions.

20 Claims, 6 Drawing Figures

WORK STATION ASSEMBLY

BACKGROUND OF THE INVENTION

1. Field of the Invention.

The work station assembly of the present invention relates to production apparatus used on manufacturing assembly lines and, more particularly, to such apparatus developed for use in conjunction with a production line conveyor system.

2. Description of the Prior Art.

The discussion of prior art will focus on the manufacture of computer disc drive apparatus, because the field is representative of the thousands of manufacturing fields utilizing work stations in conjunction with conveyors, and because the present invention was developed in response to problems involved in fabricating disc drives. It is to be understood, however, that this concentration is merely exemplary. The breadth of the invention and its applicability is not diminished.

Several basic types of work stations are known in the prior art. There are those placed near the conveyor. Usually these work stations comprise little more than tables onto which the production items are to be lifted. In the case of computer disc drives, which are often quite bulky and heavy, there were necessarily created significant risks both to the lifting personnel and to the production item itself—which could easily be dropped.

There are also work stations similar to the foregoing, but placed at a distance from the conveyor. The attendant risks are of course heightened by the increased carrying distance.

Additionally, there are cart-type work stations suitable to be moved adjacent to the conveyor for loading and then moved off to another area for the actual fabrication work. These require considerable space for storage, aisle clearance and the like, plus the expense of a heavy-duty cart for each unit in the production line.

Regardless of the particular construction of the work station employed, several significant problems were present. Loading of the production item onto the work station has been discussed. There was also the problem of working on the underside of the production item. Most prior art stations made no provision in this regard, and several people were often necessary to turn over the production item. Some prior art work stations did provide means for flipping over the production item, but often the assembly was not as stable as might be desired, or there was inadequate provision for otherwise maneuvering the production item (as by rotating it about a vertical axis) or retaining it at various "odd" angles of rotation.

The above difficulties were heightened with regard to disc drive manufacturers using a particular style of conveyor and conveyor layout. Modern factory plans often seek to optimize spatial efficiency by utilizing recirculating conveyors that loop back upon themselves. Such conveyors make it possible to immediately and easily recycle a nonconforming production item, without the necessity of manually removing it from the conveyor and replacing it upstream. However, such conveyor arrangements means that floor space is at a premium. There is often simply no room available in which to carry a disc drive to a rather distant work station. Nor is there room to maneuver a cart-type work station without disrupting operations. Thus, what is needed, especially in the disc drice industry, is a work station suitable for essentially permanent placement adjacent the conveyor, but which provides means for loading and flipping the disc drives without lifting or carrying.

SUMMARY OF THE INVENTION

In order to overcome the difficulties enumerated above, the preferred embodiment of the present invention provides a first planar member translatably attached to a base. Attached to the first planar member is a second planar member disposed above and in close-spaced relationship with the first planar member, such that the second planar member may be rotated about a vertical axis. A frame is attached to the second planar member so as to be rotatable with it about the vertical axis. The frame is normally disposed in a horizontal plane and maintained at a height suitable to receive work material from an adjacent conveyor. The frame has affixed thereto a number of bearing rollers to facilitate movement of the work material from the conveyor onto the work station assembly. The frame is mounted on the second planar member in such a manner that it may rotate about a horizontal axis. Locking means are provided so that the frame may be held in position at any given angle of rotation, including completely upside down. Other locking means are provided to selectively prevent translation of the first planar member and rotation of the second planar member about the vertical axis.

In preparation for receiving a disc drive base from the conveyor for localized fabrication on the work station assembly, the base of the work station assembly is placed near the conveyor with the frame aligned to receive the disc drive being transferred from the conveyor. The first planar member—on which are disposed the second planar member and the frame—is then translated horizontally until the frame is positioned directly adjacent the conveyor surface. The production item, for example a disc drive, is then rolled off of the conveyor via a series of small wheels strategically placed between the conveyor rollers with axes parallel to the longitudinal axis of the conveyor. Once on the frame, the production item is locked in position thereon. The first planar member is then translated away from the conveyor and the second planar member is normally rotated 90° about its central vertical axis. At this time, the operator may work on the exposed portions of the production item with ease, or he may elect to rotate the frame about a horizontal axis in order to work on, for instance, the bottom of the production item. Once rotated, the frame is locked in position by a cam-driven pin or a compression bolt provided for this purpose.

It should also be noted that the first planar member is provided with recesses such that it may be locked in various positions of translation with respect to the table. Locking is provided by means of cam-driven bolts engaging the recesses. Similar means are used to lock the rotation of the second planar member about a vertical axis in various positions.

In light of the foregoing, it may be appreciated that the enumerated problems of the prior art are significantly overcome by the present invention. First, the present invention allows an operator to rotate the production item throughout 360° of rotation about both vertical and horizontal axes so that work may be more easily done on all sides thereof. Second, improved means are provided for moving the production item off the conveyor and onto the work station assembly. Both of these improvements result in greater efficiency and increased safety, both to the operator and to the work material itself.

BRIEF DESCRIPTION OF THE DRAWINGS

A better understanding of the present invention may be gained from consideration of the following detailed description, taken in conjunction with the drawings, in which.

DESCRIPTION OF THE PREFERRED EMBODIMENT

Figure 1:
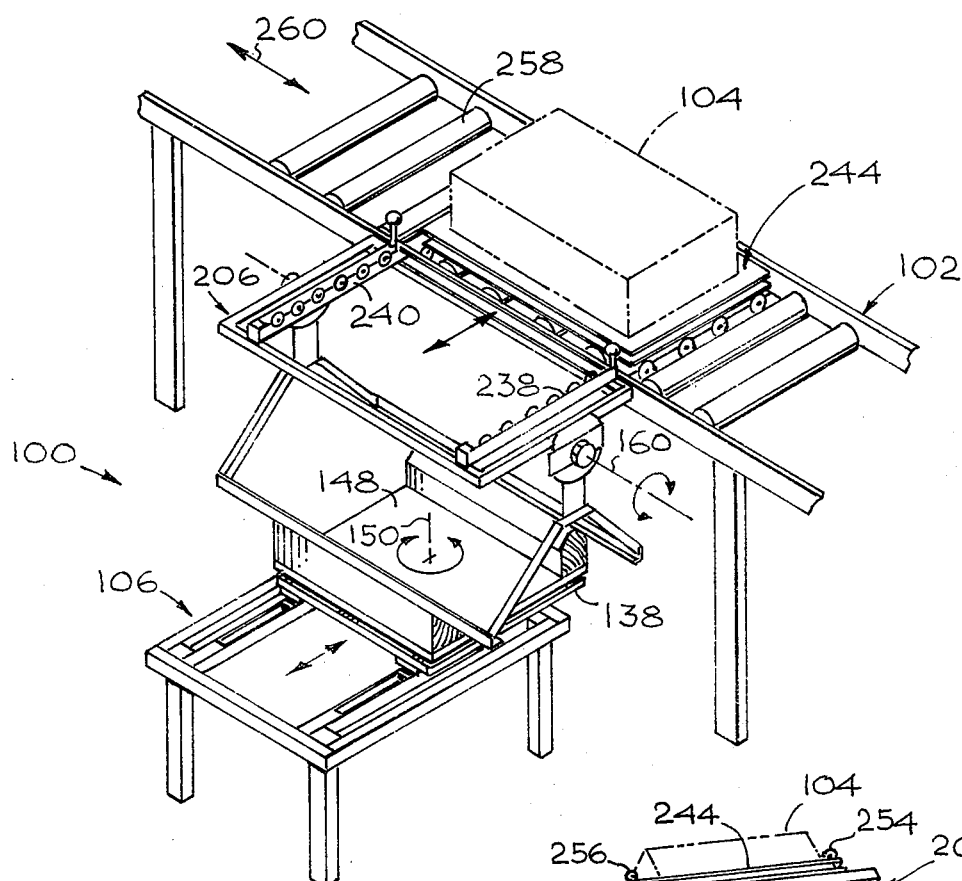
FIG. 1 is a perspective view of the present work station assembly, showing its relationship to a conveyor.
Figure 3:
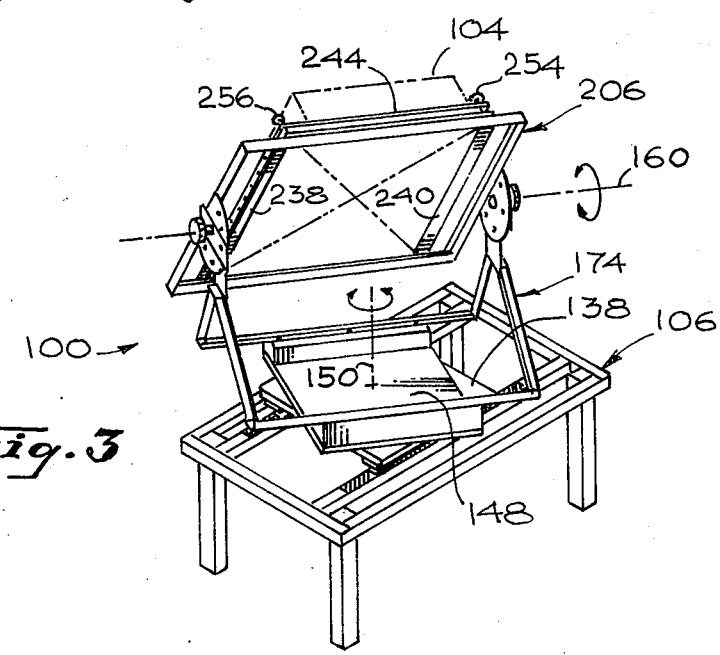
FIG. 3 is a perspective view depicting the operation of the rotating and translating means.
Figure 5:
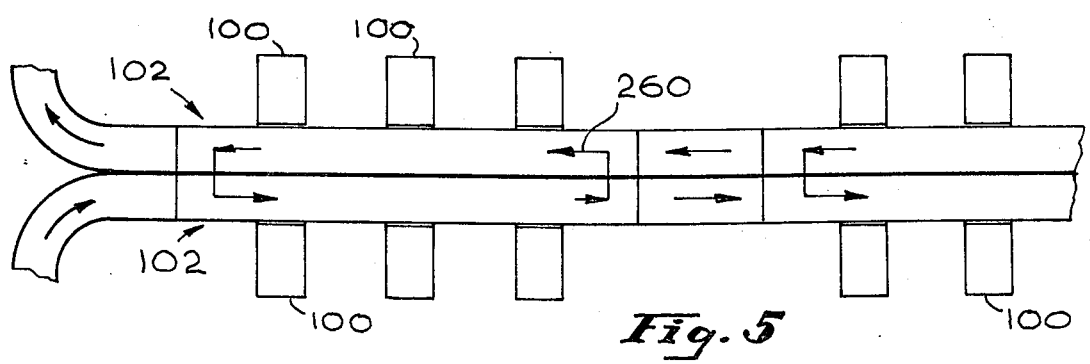
FIG. 5 is a plan view of a conveyor system with which the present invention may be used to advantage.
Figure 2A:
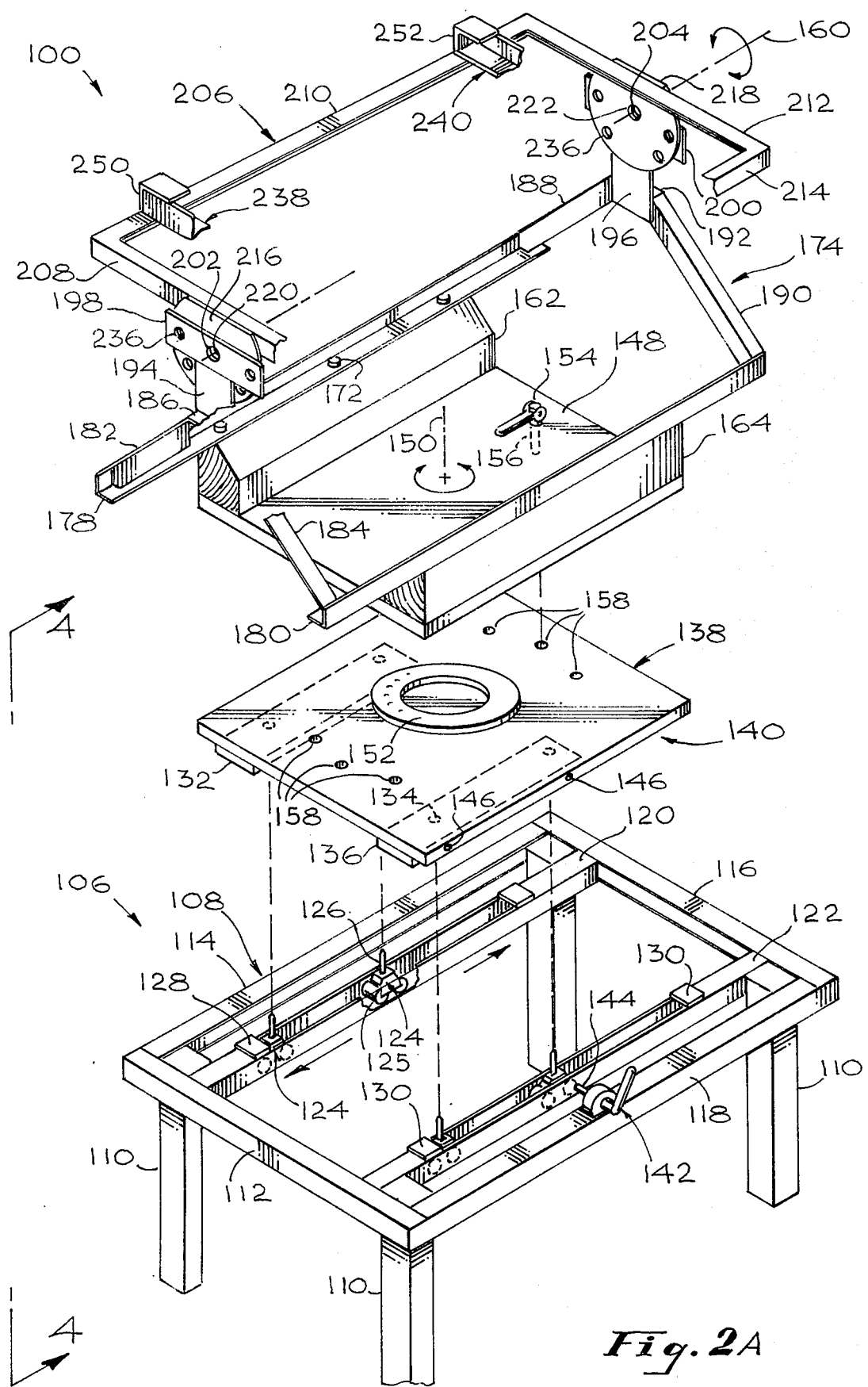
FIG. 2A is an exploded perspective view showing the major functional components of the present invention.
Figures 2B, 4:
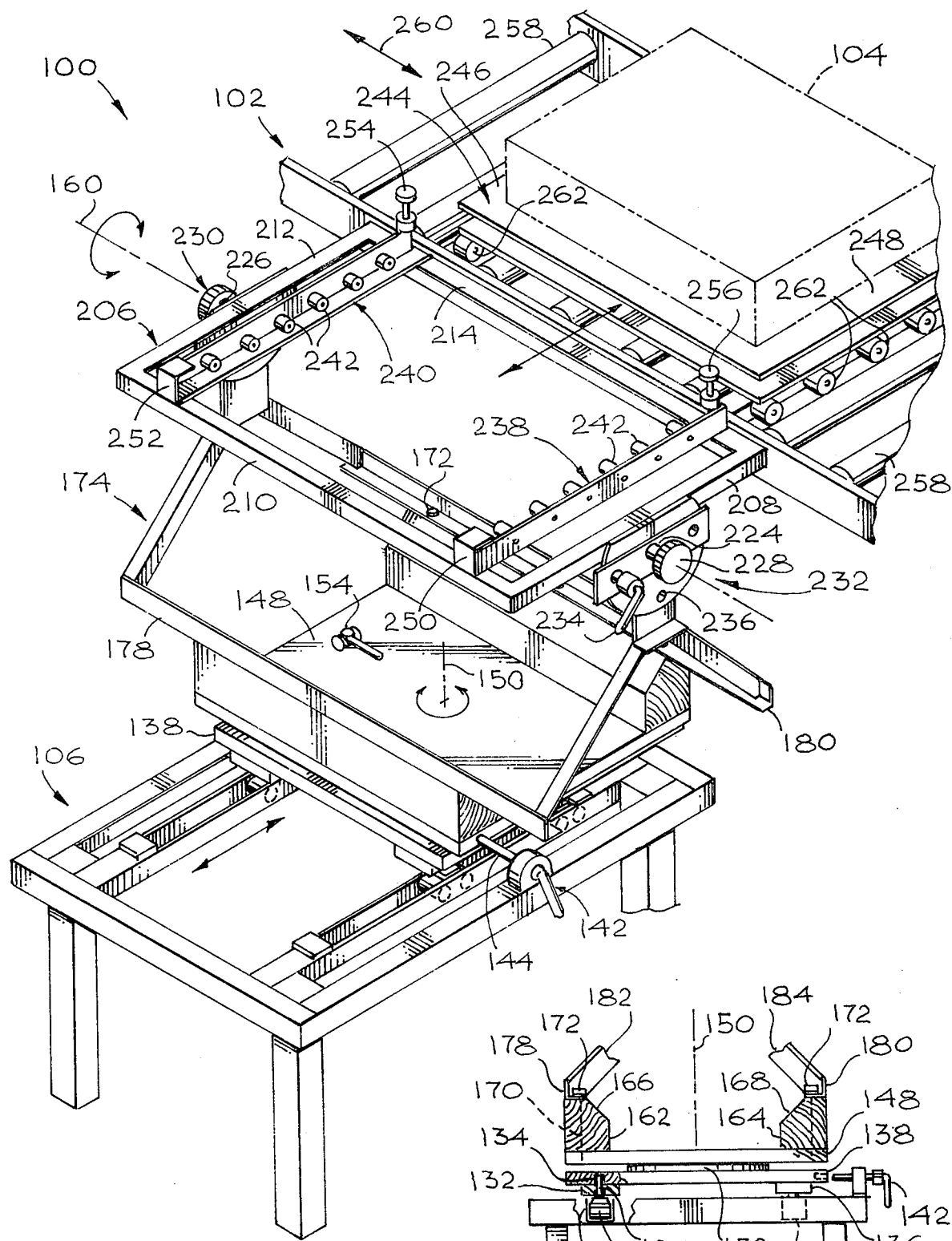
FIG. 2B is a perspective view of the present work station disposed to on-load a production item.
FIG. 4 is a partially broken-away sectional elevation taken along line 4—4 of FIG. 2A, detailing the base and the first and second planar members.

With reference first to FIGS. 1 and 2B, there is shown at 100 the preferred embodiment of the present work station assembly. A conveyor 102 is also shown, on which rests a production item 104, which may comprise a computer disc drive.

Turning to FIGS. 2A, 2B and 4, the assembly 100 is shown having a base 106 which comprises a planar framework 108 supported by substantially vertical legs 110 adapted to rest on the floor. It is contemplated that the framework 108 be rectangular in shape, formed of opposing pairs of horizontal members, 112 and 114, and 116 and 118, respectively. The framework 108 is fashioned of channel steel of U-shaped cross-section. The entire base 106 is fashioned in a rigid manner so as to adequately support the other elements of the work station assembly 100.

Rigidly affixed to opposing parallel horizontal members 112 and 116 and extending therebetween in parallel manner are struts 120 and 122, which in the preferred embodiment are formed of channel steel of U-shaped cross-section. The struts 120 and 122 are disposed such that the channels open upwardly.

Disposed within the struts 120 and 122 are a plurality of trolley bearings 124. In the preferred embodiment, two of the trolley bearings 124 are disposed within strut 120 and two within strut 122. The trolley bearings 124 are of a well-known variety, having wheels 125 for rolling longitudinally of the struts 120 and 122, and pins 126 projecting upwardly.

The longitudinal excursion of trolley bearings 124 is regulated by stops 128 in strut 120 and stops 130 in strut 122. The stops are situated so as to preclude the trolley bearings 124 from travelling the entire distance between horizontal members 112 and 116.

Fixedly attached to the two trolley bearings 124 in strut 120 is a spacer 132, formed of a flat rectangular piece of wood aligned with the longitudinal axis thereof substantially parallel to the longitudinal axis of the strut 120. The spacer 132 is attached to the trolley bearings 124 by longitudinally spaced apart recesses 134 which are engaged by the pins 126 of the two trolley bearings 124 in the strut 120. A similar spacer 136 is attached to the two trolley bearings 124 in the strut 122 in like manner.

A first planar member 138 is rigidly secured to the spacers 132 and 136 by any well known fastening devices such as may occur to those skilled in the art. The first planar member 138 is fashioned of square, flat wood stock.

The first planar member 138 is so secured to the spacers 132 and 136 that there is a substantial overhang (indicated generally at 140) when viewed in an elevation. The overhang 140 facilitates loading of the production item 104 from the conveyor 102 to the work station assembly 100.

A locking apparatus 142 comprises a cam-actuated pin 144 of the well-known variety, which is adapted to be received in any of a plurality of recesses 146 suitably provided in the side of the first planar member 138. The cam-actuated pin 144 is fixedly mounted on the horizontal member 118 of the base 106. It may be readily appreciated that the locking apparatus 142 allows an operator to prevent movement of the first planar member 138 relative to the base 106. The plurality of recesses 146 ensures that several locking positions are available.

Disposed immediately above first planar member 138 in close-spaced relationship is a second planar member 148, which may be fashioned generally in like manner as the first planar member 138. Rotation about a vertical axis (indicated by reference numeral 150) is provided by a "lazy susan" type of bearing 152 attached between the first and second planar members 138 and 148. Such bearings commonly provide a circular race containing a number of ball bearings to give the desired low-friction rotation.

A locking apparatus 154 is provided to selectively prevent rotation about the vertical axis 150. A cam-actuated pin 156 of the above-described type is rigidly affixed to the upper surface of the second planar member 148 suitably to selectively engage a plurality of corresponding recesses 158 in the first planar member 138.

Apparatus for selectively providing for rotation about a horizontal axis 160 includes a pair of vertical spacing blocks 162 and 164, which are rigidly affixed to the upper surface of the second planar member 148 along opposite edges thereof. The spacing blocks 162 and 164 are formed of longitudinally extending blocks of wood provided with upward facing longitudinally extending bevels 166 and 168, respectively, facing generally inwardly of the second planar member 148. Any common fastening means can be used, but it is contemplated that a plurality of bolts 170, secured bu nuts 172, secure the blocks 162 and 164 to the second planar member 148.

Secured to the upper surfaces of vertical spacing blocks 162 and 164 is a rigid framework 174 for rotatably supporting the retaining struts (described below) in vertically spaced-apart relationship from the second planar member 148 so as to provide sufficient clearance for rotation of the production item 104 about the horizontal axis 160.

The framework 174 comprises a pair of struts 178 and 180 secured to the upper surface of blocks 162 and 164, respectively, and which extend longitudinally thereof. The struts 178 and 180 may be secured in position by the bolts 170 which also retain the vertical spacing blocks 162 and 164. It is contemplated that the struts be formed of steel angle iron, but other materials may also be used, while remaining within the scope of the invention.

The framework 174 further comprises legs 182 and 184 which meet at a rigid vertex 186, and legs 188 and 190 which meet at a rigid vertex 192. The lower ends of the legs 182, 184, 188 and 190 are rigidly affixed to the respective ends of the struts 178 and 180; they may also be formed of angle iron stock.

Rigidly affixed to the vertices 186 and 192 and extending vertically upward therefrom are braces 194 and 196, which include flanges 198 and 200, respectively, provided with horizontally extending throughholes 202 and 204. The holes 202 and 204 are aligned so as to define the horizontal axis 160.

Supported by the braces 194 and 196 by means of the respective holes 202 and 204 is a second planar framework 206 comprised of four struts 208, 210, 212 and 214 fashioned into a rigid rectangle. The struts may be formed of steel angle iron. Disposed along the undersides of struts 208 and 212 in dependent manner are substantially semi-circular steel plates 216 and 218. Through-holes 220 and 222 are provided in plates 216 and 218 respectively—extending horizontally through each—suitable for alignment with the holes 202 and 204, and for receiving bolts 224 and 226.

The bolts 224 and 226 are provided with nuts 228 and 230 suitable to be easily hand-tightened by an operator. The bolts 224 and 226 are disposed horizontally through the respective holes 202 and 220, and 204 and 222, thus rotatably supporting the second planar framework 206.

A locking apparatus 232 is provided to selectively prevent rotation about the horizontal axis 160. The locking apparatus 232 comprises the bolts 224 and 226, and their associated nuts 228 and 230, which may be manually tightened sufficiently to frictionally hold the second planar framework 206 in any angular position. The locking apparatus 232 additionally comprises a cam-actuated pin 234 mounted horizontally on the flange 198. A plurality of holes 236 is provided through the plate 216 in such a manner that they align with the pin 234 when the second planar framework 206 is positioned at various discrete angular orientations. The support struts 238 and 240 are disposed in parallel, spaced-apart manner between the struts 210 and 214, with sufficient spacing therebetween to receive and retain the production item 104.

Support struts 238 and 240 are provided with means for translatably receiving the production item 104 from the conveyor 102. A plurality of bearing rollers 242 are disposed on support struts 238 and 240 such that the axes of the bearing rollers 242 are perpendicular to the longitudinal axes of the struts 238 and 240.

The disc drive 104 is mounted—for purposes both of fabrication and later shipping—on a packing frame 244. The packing frame 244 is shaped to receive the perimeter of the bottom of the disc drive 104 and is bolted to the disc drive 104 at all times here under consideration.

The packing frame 244 is fashioned of channel steel, of C-chaped cross-section. The two opposing side members 246 and 248 are disposed so as to engage the bearing rollers 242 when the disc drive 104 is translated off the conveyor 102 and onto the retaining struts 238 and 240. The disc drive rides on the rollers 242 on the under surfaces of the upper horizontal flanges of the side members 246 and 248 of the packing frame 244.

Three distinct mechanisms for retaining the production item 104 are provided.

Rigidly affixed (as by welding) to one end of the suppport strut 238 is an elbow 250. The elbow 250 is formed of steel and includes an upstanding transverse portion so as to prevent the disc drive 104 from rolling past the end of the support strut 238 when the disc drive 104 is being loaded onto the work station assembly 100. A similar elbow 252 is rigidly attached to the corresponding end of the support strut 240.

The disc drive 104 is retained at the opposite ends of the support struts 238 and 240 by vertical (as viewed in FIG. 2B) bolts 254 and 256, which fit corresponding recesses (not shown) in the packing frame 244. Thus, both ends of the support struts 238 and 240 are blocked.

A third mechanism for retaining the disc drive 104 on the retaining struts 238 and 240 is the interaction of the bearing rollers 242 with the packing frame 244. Once the packing frame 244 is engaged by the bearing rollers 242 and the disc drive 104 is retained by the bolts 254 and 256 and the elbows 250 and 252, the lower horizontal flange of the side members 246 and 248 of the packing frame 244 prevents the disc drive 104 from falling away from the retaining struts 238 and 240 when the second planar framework 206 is flipped over.

In operation, the work station assembly 100 is situated adjacent the conveyor 102. The conveyor 102 comprises a plurality of rollers 258 having longitudinal axes transverse to that of the conveyor 102. The direction of travel of production items on the conveyor 102 is indicated by the arrow 260.

Directly adjacent the work station assembly 100, the conveyor 102 is provided with two parallel rows of wheels 262, aligned such that their axis of rotation parallel the direction of travel of the conveyor 102. The two rows are disposed in spaced-apart relationship from one another whereby the two side members 246 and 248 of the packing frame 244 may simultaneously rest on the respective rows of wheels 262. The tops of the wheels 262 are at the same height as the tops of the rollers 258, thus allowing an operator to hold the production item 104 against the normal conveyor movement.

Once the work station assembly 100 is situated near the conveyor 102, the operator rotates the second planar member 148 so as to algin the retaining struts 238 and 240 suitably to receive the production item 104. Then the operator translates the first planar member 138 toward the conveyor 102 in order to move the retaining struts 238 and 240 into close-spaced relationship with the conveyor 102. The first planar member 138 will extend in cantilever fashion over the edges of the base 106.

It is then easy to roll the production item 104 onto the retaining struts 238 and 240, with the aid of the wheels 262 and the bearing rollers 242 engaging the packing frame 244. Once the production item 104 is completely supported by the retaining struts 238 and 240, the bolts 254 and 256 are driven into engagement with the recesses of the packing frame 244.

The operator now retracts the first planar member 138 from the extended position, and rotates the second planar member 248 so that the production item 104 is deployed suitably for the performance of fabrication tasks. If necessary, the production item 104 may be flipped over about the horizontal axis 160 to further facilitate the work.

Although there have been described above specific arrangements of a work station assembly in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A work station assembly for use in a production system including a production line conveyor, the work station assembly being adapted for receiving a production item from the conveyor and retaining said item for translation relative to and rotation about first and second mutually perpendicular axes and comprising:
 a base positionable near the conveyor;
 translation means including a first planar member supported on said base for translational movement thereof toward and away from said conveyor;
 first rotation means including a second planar member rotatably mounted to the first planar member for rotational movement relative thereto about a substantially vertical axis;
 retaining means for engaging and retaining the production item, comprising a platform having a pair of opposed, spaced-apart support struts, each strut having a plurality of bearing rollers disposed thereon for supporting the production item during transfer to and from the conveyor, the axes of rotation of the bearing rollers being disposed perpendicular to the longitudinal axes of the support struts; and
 second rotation means including a support frame attached to the second planar member and means rotatably mounting said support struts to said frame for rotation about a substantially horizontal axis.

2. The work station assembly of claim 1 wherein the retaining means further includes a packing frame affixed to the production item and adapted to engage the bearing rollers for retention thereon in both a right-side-up and an upside-down attitude.

3. The work station assembly defined in claim 1, in which said translation means comprises a fixed portion attached to said base, a movable portion, and bearings disposed between said fixed and said movable portions, and in which said movable portion of said translation means is selectively translatable in a substantially horizontal plane.

4. The work station assembly defined in claim 3 additionally comprising means for selectively locking said movable portion of said translation means against translating.

5. The work station assembly defined in claim 4 in which said means for selectively locking said movable portion of said translation means against translating comprises a pin disposed on one of said movable portion of said translation means and said base so as to selectively engage a plurality of recesses in the other of said movable portion of said translation means and said base.

6. The work station assembly defined in claim 1 additionally comprising means for selectively locking said first rotation means so as to prevent rotation of said retaining means about the substantially vertical axis.

7. The work station assembly defined in claim 6 in which said means for selectively locking said first rotation means comprises a pin disposed on one of said first rotation means and said translation means for engaging a plurality of recesses on the other of said first rotation means and said translation means.

8. The work station assembly defined in claim 1 additionally comprising means for selectively locking said second rotation means so as to prevent said retaining means for rotating about the substantially horizontal axis.

9. The work station assembly defined in claim 8 in which said second rotation means comprises a fixed portion and a rotatable portion, and said means for selectively locking said second rotation means comprises a pin disposed on one of said fixed portion of said second rotation means and said movable portion of said second rotation means for selectively engaging a plurality of recesses on the other of said fixed portion of said second rotation means and said movable portion of said second rotation means.

10. The work station assembly defined in claim 9 in which said means for selectively locking said second rotation means additionally comprises an adjustable bolt member for selectively frictionally locking said second rotation means.

11. The work station assembly defined in claim 1 in which said retaining means comprises means for translatably receiving and engaging the production item from a conveyor.

12. The work station assembly defined in claim 1 further comprising means for retaining the production item against movement relative to said support struts.

13. The work station assembly defined in claim 12 in which said means for retaining the production item against movement relative to said support struts comprises a pair of elbows rigidly connected to respective ones of said pair of support struts at the ends thereof, said elbows including portions extending transversely of said support struts so as to prevent the production item from translating past the ends of said support struts.

14. The work station assembly defined in claim 12 in which said means for retaining the production item against movement relative to said support struts further comprises:
 a. recess in the end of one of said support struts; and
 b. a bolt suitable to engage said recess and extending transversely to said longitudinal axes of said support struts so as to prevent the production item from translating past the end of one of said support struts.

15. The work station assembly defined in claim 12 in which:
 a. each of said support struts includes an upstanding flange and a transverse flange;
 said transverse flanges define a plane; and
 c. said work station assembly further comprises means for retaining the production item against forces perpendicular to the plane defined by said transverse flanges of said support struts.

16. The work station assembly defined in claim 15 in which said means for retaining the production item against forces perpendicular to the plane defined by said transverse flanges of said support struts comprises a pair of parallel, outwardly opening channels disposed on opposite sides of the production item, said channels including lower and upper horizontal flanges defining a vertical dimension therebetween, which vertical dimension is slightly greater than the diameter of said bearing rollers so as to facilitate rolling engagement of said channels with said bearing rollers.

17. The work station assembly defined in claim 3 in which said fixed portion of said translation means comprises a pair of parallel, horizontally extending, upwardly opening channels attached to said base.

18. The work station assembly defined in claim 17 in which said translation means comprises a plurality of trolley bearings disposed in said channels, each of said trolley bearings including wheels aligned so as to roll longitudinally of said channels.

19. The work station assembly defined in claim 3 in which said first rotation means comprises:
 a. a bearing member disposed on said first planar member of said translation means, said bearing member including a circular race and a plurality of ball bearings in said race; and
 b. the second planar member being connected to said bearing member so as to be rotatable about the vertical axis.

20. The work station assembly defined in claim 1 in which said second rotation means comprises:
 a. a planar framework:
 b. a vertical framework connected to said translation means for movement therewith and to said first rotation means for rotation therewith, said framework being adapted to support said retaining means in vertically spaced-apart relationship from said translation means; and
 c. a pair of bolts co-linearly horizontally disposed in said vertical support framework for rotatable supporting said planar framework.

* * * * *